March 3, 1936.                    W. A. BLACK                    2,032,866
                            LENS CASE LOCKING DEVICE
                              Filed Dec. 19, 1934
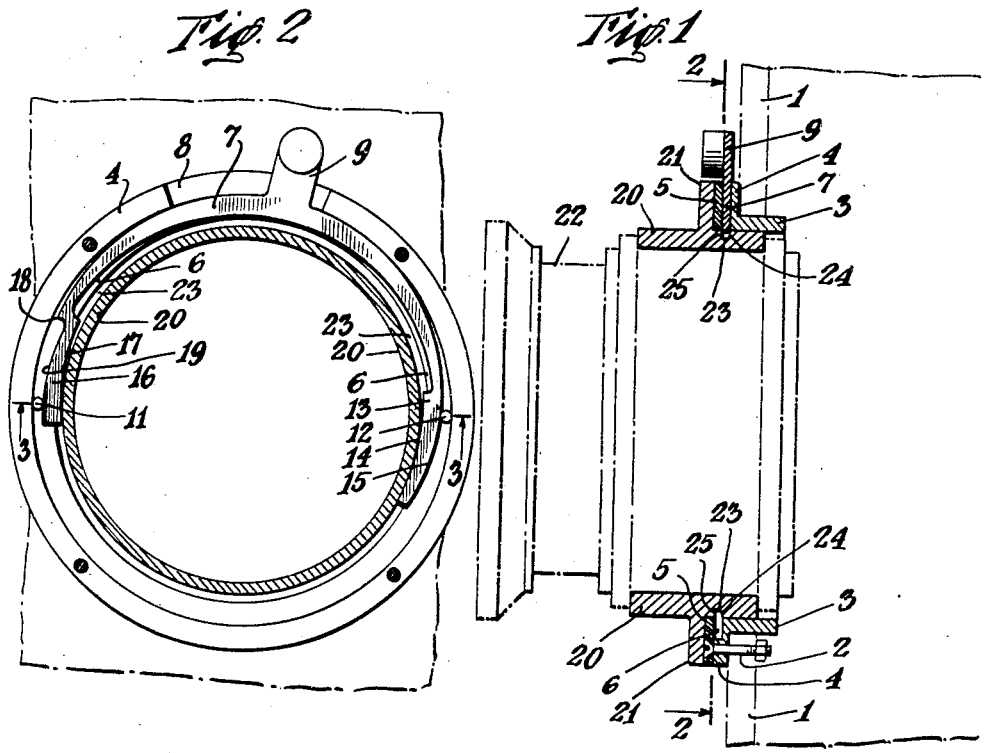
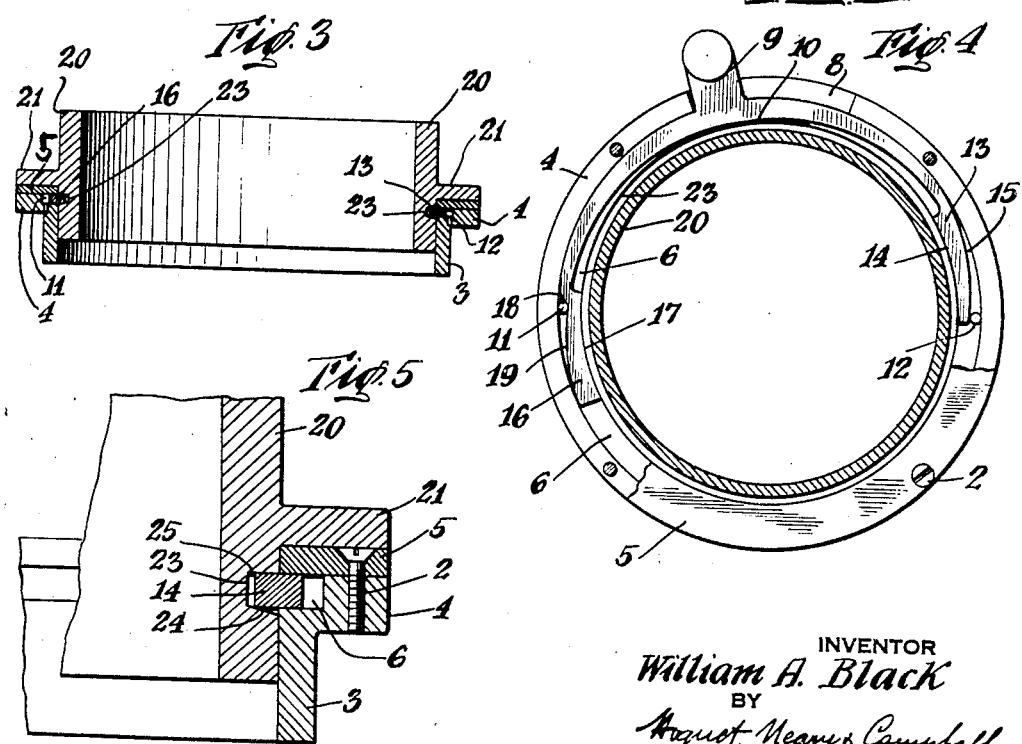
INVENTOR
William A. Black
BY
Huguet, Neary & Campbell
ATTORNEYS Patented Mar. 3, 1936

2,032,866

UNITED STATES PATENT OFFICE 2,032,866

LENS CASE LOCKING DEVICE

William A. Black, Montclair, N. J., assignor to Fairchild Aerial Camera Corporation, Woodside, N. Y., a corporation of New York Application December 19, 1934, Serial No. 758,235

5 Claims. (Cl. 88—57)

This invention relates in general to locking devices more particularly providing a means of quick detachment of a lens casing to a camera.

The conventional practice is to design a lens casing to suit the purpose of a lens predetermined for a particular camera without thought given to interchangeability of lenses for the camera. Those cameras that have been provided with interchangeable lenses and lens casing have employed complicated attachment devices that have been found inefficient and ineffective in their operation for quick assembly and disassembly and positive predetermined alignment when assembled.

An object of the present invention therefore is to provide a locking device of the simplest and positive acting form which requires the simplest form of manual operation.

Another object is to provide such a locking device that will insure proper light-tight alignment with the least possibility of misalignment due to inadvertence in its manual operation or otherwise.

With the foregoing and other objects in view, the invention resides in the combination of parts and in the details of construction hereinafter set forth in the following specification and appended claims, certain embodiments being illustrated in the accompanying drawing, in which:

Figure 1 is a view in longitudinal section taken through the locking device, showing the lens casing and the front partition of the camera in dotted lines.

Figure 2 is a view in cross-section taken along line 2—2 of Figure 1.

Figure 3 is a view in section taken along line 3—3 of Figure 2, showing the locking ring in clamped locking position.

Figure 4 is a view similar to Figure 2 showing the locking ring in unclamped position.

Figure 5 is an enlarged fragmentary detailed view showing the locking ring and the wedging action brought about by its engagement with the inclined surface of the groove in the inner member as it is locked to the outer member.

Referring more particularly to the drawing, the front partition of the camera is shown in dotted lines at 1. To this partition may be secured, by such bolts as 2, a ring 3 with a flange 4 in light-tight relation to the outer boundary of the exposure opening formed in the partition. The screw bolts 2 extend not only through the flange 4 and the partition but also through a removable circular plate 5 whose inner diameter equals that of ring 3 and whose outer diameter equals that of flange 4.

The flange 4 is provided with a circular groove 6 extending from the inner diameter substantially half way to its outer extremity. Referring to Figures 3 and 4, this groove forms a housing for locking ring 7. The flange 4 has a limited recess 8 extending through its inner and outer diameters to allow a handle 9 of the locking ring to protrude for manual operation within the limits of the length of the arcuate recess 8. The locking ring is preferably of some resilient distortable material. It may be inserted in the groove 6 prior to affixing the cover plate 5, after which the assembly may be secured to the partition by the same or separate bolts, as may be desired. In inserting the locking ring, however, the locking ring should be of a normally greater outside dimension than the outer confines of the groove so that when the locking ring is sprung into the groove the locking ring constantly springs outwardly to impinge the outer confines of the groove.

Thus as shown in Figure 4, at no point does the inner diameter of the locking ring extend past the inner diameter of the grooves or the flange 4 or ring 3, although at one point 10 it is substantially flush therewith. The locking ring extends approximately half way around in the groove. At points substantially diametrically opposite, the flange 4 is provided with pins 11 and 12 near the outer extremity of the groove but parallel with the side wall thereof. The locking ring is of a particular form, it being radially thickest near its handle portion. It then tapers to become smaller toward the right, the inner diameter becoming excentric while the outer diameter is forced to remain concentric in the groove except where it terminates in an enlarged portion 13 with a concentric inner diameter 14 and an excentric outer diameter tapering radially inward. On the other side of the handle portion the locking ring has its outer diameter concentric with its inner diameter excentric and tapering radially outward except where it terminates in an enlarged portion 16 resulting from a sharp drop in the taper of the inner diameter to continue in a concentric inner diameter 17 to the extremity of the locking ring. The outer diameter also has a sudden drop providing a shoulder 18 and from there on the outer diameter 19 of the locking ring is excentric and tapers radially outward.

As shown in Figure 4, the outer diameter or surface 19 of the locking ring under its own spring pressure bears outwardly on pin 11 while surface 15 likewise bears outwardly on pin 12. However, when the relationship shown in Figure 4 prevails, the inner diameter, or surface, of the locking ring does not project inwardly of the opening defined by the inner diameter of flange 4 or ring 3. The handle abuts the left extremity of the arcuate recess 8 and the pin 11 may abut shoulder 18 for limiting the movement of the locking ring in its groove.

When the assembly is in this position the lens casing 20 may be inserted within the ring 3 until its circular flange 21 abuts the plate 5. That portion of the lens casing that is involved is shown in full lines at 20 while the remainder of the conventional type of lens casing integral therewith is shown in dotted lines at 22. The lens casing 20 is formed with a peripheral groove 23, the inner wall 24 of which, as viewed in Figure 1, is inclined outwardly towards the rear of the lens casing 20 while its other side wall 25 may remain straight. As the lens casing flange 21 abuts or approximately abuts the plate 5 the grooves 6 and 23 become approximately aligned. In order to lock the lens casing in position on the camera, it then becomes necessary only to move the handle 9 from the position shown in Figure 4 toward the right. The result of this operation is shown in Figure 3. Portion 16 is forced inwardly as pin 11 rides relatively downwardly on its tapered surface 19 and likewise portion 13 is forced inwardly as pin 12 rides relatively upwardly on its tapered surface 15, it being understood that the locking ring is movable and pins 11 and 12 stationary. These portions 14 and 16 simultaneously and to the same degree engage groove 23 in the lens casing. Due to the inclined wall or surface 24 of the groove 23 the effect is a wedging action. Thus as the handle is moved clockwise the wedging or drawing or clamping action continues so as to bring about an effective aligned and light-tight connection of the lens casing. The manipulation involves only the simple sliding in of the lens casing and a simple manual rotation of the handle. It follows that a manipulation of the handle in a reverse direction releases the locking engagement. This is because the locking ring, when released from its inwardly distorted position due to the pins 11 and 12, springs outwardly to assume the position shown in Figure 4, in which position the lens casing 20 is free to be removed from the camera.

I claim:

1. In combination in a camera, a lens casing and a mount in said camera therefor, a single manually controlled means for releasably locking and clamping said lens casing in said mount, said means comprising a rotatable locking member, said mount having a groove in which said member is carried, said lens casing being provided with a groove capable of registry with the groove in said mount, said locking member having concentric and excentric portions and being of resilient material, stationary members engaging said excentric portions and adapted upon rotation of said locking member to force portions thereof into engagement with the groove of said lens casing.

2. In combination in a camera, a lens casing and a mount in said camera therefor, a single manually controlled means for releasably locking and clamping said lens casing in said mount, said means comprising a rotatable locking member, said mount having a groove in which said member is carried, said lens casing being provided with a groove capable of registry with the groove in said mount, said locking member having concentric and excentric portions and being of resilient material, stationary members engaging said excentric portions and adapted upon rotation of said locking member to force portions thereof into engagement with the groove of said lens casing, whereby said lens casing is releasably locked in said mount.

3. In combination in a camera, a lens casing and a mount in said camera therefor, a single manually controlled means for releasably locking and clamping said lens casing in said mount, said means comprising a rotatable locking member, said mount having a groove in which said member is carried, said lens casing being provided with a groove capable of registry with the groove in said mount, said locking member having concentric and excentric portions and being of resilient material, stationary members engaging said excentric portions and adapted upon rotation of said locking member to force portions thereof into engagement with the groove of said lens casing, said last named groove having an inclined wall whereby the engagement of said locking member therewith effects a locking engagement.

4. In combination in a camera, a lens casing and a mount in said camera therefor, a single manually controlled means for releasably locking and clamping said lens casing in said mount, said means comprising a rotatable locking member, said mount having a groove in which said member is carried, said lens casing being provided with a groove capable of registry with the groove in said mount, said locking member having concentric and excentric portions and being of resilient material, stationary members engaging said excentric portions and adapted upon rotation of said locking member to force portions thereof into engagement with the groove of said lens casing, said last named groove having an inclined wall whereby the engagement of said locking member therewith effects a locking engagement, and a clamping and drawing action between said lens casing and said mount.

5. In combination with a camera, a lens casing and a mount in said camera therefor, a single manually controlled resilient member having cam surfaces thereon, means carried by said mount and adapted to coact with said cam surfaces for flexing said member for releasably locking and clamping said lens casing in said mount.

WILLIAM A. BLACK.